United States Patent
Singh et al.

[11] Patent Number: 6,079,482
[45] Date of Patent: Jun. 27, 2000

[54] CLATHRATE FORMING MEDIUM AND ITS USE IN THERMAL ENERGY STORAGE SYSTEMS AND PROCESSES FOR THERMAL ENERGY STORAGE AND TRANSFER

[75] Inventors: Rajiv R. Singh, Williamsville; Raymond H. P. Thomas; D. P. Wilson, both of Amherst; R. Robinson, Cheektowaga, all of N.Y.

[73] Assignee: AlliedSignal Inc., Morristown, N.J.

[21] Appl. No.: 09/104,645

[22] Filed: Jun. 25, 1998

Related U.S. Application Data

[62] Division of application No. 08/851,159, May 5, 1997, Pat. No. 5,778,685, which is a continuation of application No. 08/513,566, May 11, 1995, abandoned, which is a continuation of application No. 07/995,239, Dec. 22, 1992, abandoned.

[51] Int. Cl.[7] .................................................. F28D 17/00
[52] U.S. Cl. .................................................. 165/10; 252/70
[58] Field of Search .................................. 165/10, 104.21; 257/70; 62/59

[56] References Cited

U.S. PATENT DOCUMENTS

| | | | |
|---|---|---|---|
| 4,332,690 | 6/1982 | Kimura et al. | 165/10 X |
| 4,540,501 | 9/1985 | Ternes et al | 252/70 |
| 4,696,338 | 9/1987 | Jensen et al. | 165/10 X |
| 4,821,794 | 4/1989 | Tsai et al. | 165/107.17 |
| 4,972,998 | 11/1990 | Corr | 165/10 |
| 5,140,824 | 8/1992 | Hunt | 62/5 A |
| 5,159,971 | 11/1992 | Li | 165/10 |
| 5,277,834 | 1/1994 | Bivens | 252/67 |

FOREIGN PATENT DOCUMENTS

92/15639  9/1992  WIPO .

OTHER PUBLICATIONS

Mori, Yasuhiko, et al., "Formation of Gas Hydrate with EFC Alternative R–134a", AIChE Journal, vol. 35, No. 7, Jul. 1986, pp. 1227–1228.
Kokai Patent Publication No. 10096—1990, Jan. 12, 1990 "Latent Heat Storage Material".
Von Stackelbergand Muller (Z. Electrochem. 58(1), 25–39 (1954).
Stouch and Hurs, J. Chem. Inf. Comput. Sci. 26, 4–12 (1986).

*Primary Examiner*—Christopher Atkinson
*Attorney, Agent, or Firm*—Jay P. Friedenson; Marie L. Collazo

[57] ABSTRACT

An improved thermal energy storage system and a process for thermal energy storage and transfer are disclosed. The cooling medium, a clathrate forming mixture, comprises water, and a hydrofluorocarbon having at least three carbon atoms and a molecular diameter less than about 7 Å. Preferably the hydrofluorocarbon is selected from hydrofluoropropanes and more preferably is selected from the group consisting of $CHF_2CHFCHF_2$, $CF_2HCF_2CH_2F$, $CF_3CHFCH_2F$, $CF_3CH_2CF_2H$, $CF_3CF_2CH_3$, $CF_3CHFCF_2H$, $CF_3CH_2CF_3$, $CF_3CF_2CF_2H$, $CH_2FCF_2CF_3$, $CHF_2CF_2CH_3$, $CF_3CF_2CF_2CH_3$, $CF_3CF_2CF_2CF_2H$, and $CF_3CFHCFHCF_3$.

10 Claims, 1 Drawing Sheet

CLATHRATE FORMING MEDIUM AND ITS USE IN THERMAL ENERGY STORAGE SYSTEMS AND PROCESSES FOR THERMAL ENERGY STORAGE AND TRANSFER

This application is a division of application Ser. No. 08/851,159 filed May 5, 1997, now U.S. Pat. No. , 5,778,685, which is a continuation of application Ser No. 08/513,566, filed May 11, 1995, now abandoned, which is a continuation of application Ser. No. 07/995,239 filed Dec. 22, 1992, now abandoned.

BACKGROUND OF THE INVENTION

The use of air conditioners during the summer months requires large quantities of energy primarily during the daytime hours when other forms of energy consumption are also high. Peaking generators are required to increase electricity generating capacity so that power loads are met. However, energy consumption decreases dramatically at night, and the peaking generators are not needed. Thus, the expensive peaking generators are run only half the time, decreasing the efficiency of the power facility. To alleviate this problem, thermal energy storage systems, which can utilize off peak, night-time electricity have been proposed.

Thermal energy storage systems contain a cooling medium, which is frozen during the off peak, evening hours. During the daytime, heat from the surrounding area is used to melt the frozen cooling medium. The removal of heat to drive the decomposition causes the surrounding area to become cooler.

Gas or liquid clathrates made from refrigerants and water have been suggested as cooling media suitable for thermal energy storage systems. For example, U.S. Pat. No. 4,540,501 discloses using as the guest molecule a refrigerant chosen from brominated, chlorinated and fluorinated hydrocarbons including $CCl_2F_2$, $CCl_3F$, $CBr_2F_2$, $CH_2ClF$ and $CH_3CClF_2$.

However, many of the guest molecules presently being used are CFCs such as trichlorofluoromethane (R-11). The use of these compounds is becoming disfavored because of the possible detrimental effect to the ozone layer. Hydrofluorocarbons are believed to pose no threat to the ozone layer, and are thus the preferred guest molecules.

DETAILED DESCRIPTION OF THE DRAWING

Figure 1:
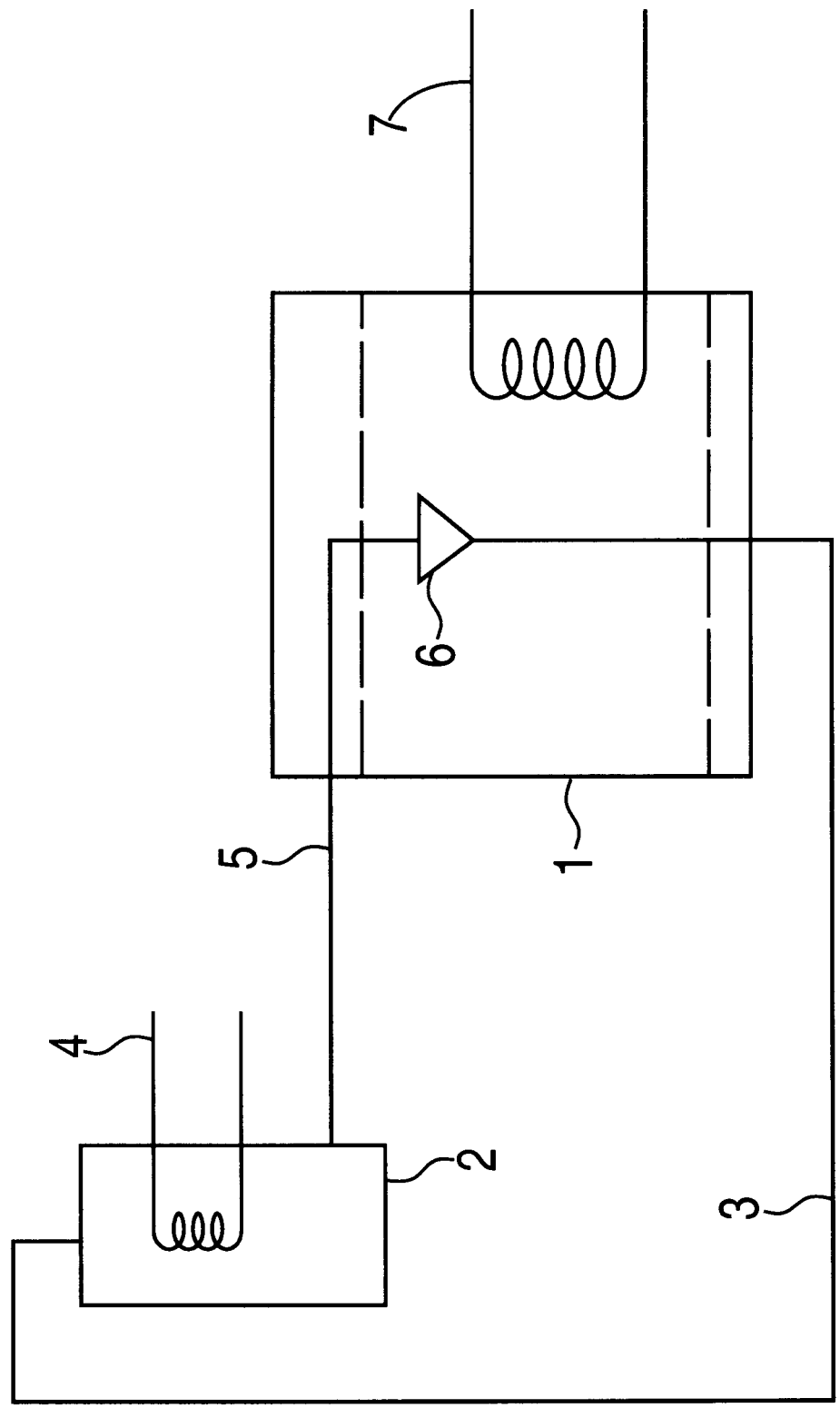

FIG. 1 shows a preferred embodiment of the present invention, a clathrate formation apparatus including an ultrasonic atomizer.

DETAILED DESCRIPTION OF THE INVENTION

The present invention relates to novel clathrate forming cooling medium comprising water and a hydrofluorocarbon having at least 3 carbons and a molecular diameter less than about 7 Å. Also disclosed is a thermal energy storage system having a clathrate formation chamber containing a clathrate forming cooling medium comprising water and a hydrofluorocarbon having at least three carbons and a molecular diameter less than about 7 Å; means for lowering the temperature in said clathrate formation chamber; and means for circulating the cooling medium containing clathrate through a heat exchanger. A process for thermal energy storage and transfer comprising the steps of producing a clathrate slurry from a clathrate forming cooling medium comprising water and a hydrofluorocarbon having at least three carbons and a molecular diameter less than about 7 Å and circulating said clathrate slurry through a heat exchanger is also disclosed.

Gas or liquid hydrates or clathrates are crystalline solids with icelike lattices formed from hydrogen-bonded water molecules. The lattices contain almost spherical holes which enclose guest molecules, usually of gases and volatile liquids. The guest molecule fills the interior of the cage lattice, stabilizing the ice structure of clathrate, and allowing formation at temperatures significantly higher than the temperature of ice formation (0° C.). The structure of the clathrate usually depends upon the size of the guest molecule. Smaller guest molecules (up to about 5.3 Å diameter) form Structure 1 hydrates, containing 46 water molecules per unit cell. Each unit cell contains two small and six large cages. Larger molecules (up to about 7 Å diameter) tend to form Structure II clathrates, having 136 water molecules per unit cell. Each unit cell contains 16 small and 8 large cages.

There are several factors which may affect whether or not cage compounds or clathrates are formed. These factors include polarity, the size of molecules and their heat of vaporization. For example, compounds which have large molecular sizes are incapable of forming cage compounds or clathrates. Thus, the molecular size is critical and it is generally known that "no hydrates are known of molecules having a diameter greater than 6.9 Å". von Stackelberg and Muller (Z. Electrochem. 58(1), 25–39 (1954)). However, consistent molecular diameter measurements are difficult to obtain because the different approaches to obtaining this parameter may provide differing values. Molecular diameters discussed herein were estimated using the uniform finite element method of Stouch and Jurs, J. Chem. Inf. Comput. Sci. 26, 1986, 4–12, as implemented in the Polygraph program.

The guest molecules of the present invention are hydrofluorocarbons having at least 3 carbons, a molecular diameter less than about 7 Å and are capable of forming a cage compound with water or clathrate. Preferably the guest molecule is selected from partially fluorinated propanes and butanes i.e. those that fit the aforementioned molecular diameter criteria. Suitable propanes and butanes are listed in Table 1, below.

TABLE 1

| Compound | R # | Mol. Dia. (Å) | B P (° C.) |
| --- | --- | --- | --- |
| $CHF_2CHFCHF_2$ | R-245ea | 6.23 | |
| $CF_2HCF_2CH_2F$ | R-245ca | 6.24 | 25.0 |
| $CF_3CHFCH_2F$ | R-245eb | 6.23 | |
| $CF_3CH_2CF_2H$ | R-245fa | 6.23 | 15.3 |
| $CF_3CF_2CH_3$ | R-245cb | 6.23 | −18.3 |
| $CF_3CHFCF_2H$ | R-236ea | | 6.5 |
| $CF_3CH_2CF_3$ | R-236fa | 6.32 | −1.1 |
| $CF_3CF_2CF_2H$ | R-227ca | 6.40 | −16.3 |
| $CH_2FCF_2CF_3$ | R-236cb | | −1.44 |
| $CHF_2CF_2CH_3$ | R-254cb | 6.16 | −0.78 |
| $CF_3CF_2CF_2CH_3$ | R-347ccd | 6.77 | 15.1 |
| $CF_3CF_2CF_2CF_2H$ | R-329ccb | 6.90 | |
| $CF_3CFHCFHCF_3$ | R-338eea | 6.84 | 25.4 |

Of the compounds listed in Table 1, we have unexpectedly discovered that HFC-245ca and HFC-254cb do form clathrates while HFC-245fa, HFC-236ea and HFC-236fa do not. It was particularly surprising that under the experimental conditions HFC-245ca formed a clathrate while HFC-245fa, a positional isomer of HFC-245ca, did not.

Preferably, the hydrofluorocarbon selected has boiling point between −25° C. and 60° C., such as HFC-254cb and more preferably between about 15° C. and 40° C. so that low pressure systems may be used thereby reducing the containment costs. A preferred hydrofluorocarbons for low pressure use is 1,1,2,2,3 pentafluoropropane (HFC-245ca).

As used herein the term hydrofluorocarbons includes compounds which contain carbon, hydrogen and fluorine atoms only, and at least one of each. The hydrofluorocarbons may be linear or cyclic. Suitable hydrofluorocarbons covers a single hydrofluorocarbon as well as mixtures of hydrofluorocarbons. Hydrofluoroporpanes include compound which contain three carbon atoms and at least one each of hydrogen and fluoride, only. Moreover, other components, such as hydrochlorofluorocarbons (which contain carbon, hydrogen, chlorine and fluorine, only and at least one of each) hydrochlorocarbons (which contain carbon, hydrogen and chlorine only and at least one of each), surfactants capable of increasing the contact between water and the guest molecules or help gases, such as $CO_2$ or $N_2$ which aid in clathrate formation may also be present. Since, the hydrofluorocarbons of the present invention contain no chlorine or bromine they have zero ozone depletion potential.

The cooling medium of the present invention may be used in any thermal energy storage system known in the art, such as that of U.S. Pat. No. 4,540,501.

A preferred clathrate formation apparatus for use in a thermal energy storage system and the process for using the device are best understood by reference to FIG. 1.

The clathrate formation chamber, 1, is filled with water. The water is cooled to about 5° C. by refrigeration coil, 7. The guest molecule is cooled in chamber 2, by refrigeration coil 4 until the guest molecule solution is at the same temperature as the host solution in the clathrate formation chamber. The guest molecule solution is removed from chamber 2 via line 5, and passes through atomizer 6. The atomizer 6, introduces the guest molecule into the clathrate formation chamber 1, as particles with a diameter below about 100 microns. Preferably the diameter of the droplets is between about 20 and about 50 microns. An ultrasonic atomizer is preferred as the atomizer, however any other means for forming a large quantity of droplets of the appropriate size, thereby generating a large surface area may be used.

The droplets of guest molecule mix with the water and form a mixed clathrate which resembles snow-like flakes which have a density close to water. Preferably, the guest molecule is introduced to the clathrate formation chamber until a clathrate/water slurry is formed. Slurries have the best heat exchange properties, and are thus preferred. Once the desired clathrate slurry is formed, the atomizer 6, is shut off. During the daytime heat from the surrounding area is exchanged via refrigeration line 7, and the clathrate is decomposed.

Any guest molecule which does not form clathrate (or guest molecule which is released as a result of the decomposition of clathrate upon heating) settles to the bottom of the clathrate formation chamber 1, and may be recycled to the guest molecule chamber 2, via line 3.

The rest of the configuration of the thermal energy storage system of the present invention may be any configuration known in the art, such as U.S. Pat. No. 4,540,501.

To form a clathrate the guest molecule and water must be dissimilar and be in contact with each other. The more intimate the contact, the more efficient the clathrate formation will be. Any suitable surfactant may be used to increase the contact between the guest molecule and water, and thereby the rate of clathrate formation.

An effective amount of guest molecule and water must be present to insure clathrate formation. Preferably, an excess of water is used to maintain a slurry, and ensure continuous and efficient heat transfer. Where HFC-245ca is used as the guest molecule, at least about 15 moles and preferably at least about 17 moles of water is used for each 1 mole of HFC-245ca. Appropriate preferred ratios for other guest molecules may be readily determined by one skilled in the art using the teaching of the present invention.

Agitation is not required to ensure clathrate formation of the cooling medium of the present invention. However, agitation may be used to further encourage clathrate formation.

The clathrate is formed in a storage tank/crystallizer. The pressure in the crystallizer is decreased by means of a compressor, as described in more detail in U.S. Pat. No. 4,540,501, and heat is removed until the temperature of formation for the clathrate is reached. The pressure and temperature are maintained until all of the clathrate is formed. The clathrate is circulated through the heat exchanger via the recirculation loop. Clathrate is circulated through the heat exchanger, decomposed, and the water and guest molecule mixture is returned to the crystallizer.

EXAMPLE 1

HFC-245ca and water were mixed in a small vial in a molar ratio of 1:17 and a surfactant (sodium dodecylsulfate) was added at about its critical micelle concentration. The vial was covered and cooled to about 5° C. Crystals formed in the vial, indicating that a clathrate was formed. The vial was removed from refrigeration, and the temperature of the solution was monitored. The clathrate melted at approximately 8–12° C.

EXAMPLE 2

1,1,2,2,-tetrafluoropropane (HFC-254cb) and water were mixed in a small vial in a molar ratio of 1:17 and a surfactant was added. The vial was covered and cooled to about 5° C. Crystals formed in the vial, indicating that a clathrate was formed. The vial was removed from refrigeration, and the temperature of the solution was monitored. The clathrate melted at approximately 8–12° C.

EXAMPLE 3

1,1,1,3,3-Pentafluoropropane (HFC-245fa) and water were mixed in a small vial in a molar ratio of 1:17 and a surfactant (sodium dodecylsulfate) was added at about its critical micelle concentration. The vial was covered and cooled to about 2° C. The mixture was allowed to warm to room temperature during which the temperature of the mixture was taken at one-minute intervals. A plot of temperature versus time revealed that the temperature rose smoothly, indicating no latent heat effects. The absence of crystal formation, in addition to the absence of the latent heat effect, indicated that a clathrate did not form.

EXAMPLE 4

1,1,1,2,3,3-Hexafluoropropane (HFC-236ea) and water were mixed in a small vial in a molar ratio of 1:17 and a surfactant (sodium dodecylsulfate) was added at about its critical micelle concentration. The vial was covered and cooled to about 2° C. The mixture was allowed to warm to room temperature during which the temperature of the mixture was taken at one-minute intervals. A plot of temperature versus time revealed that the temperature rose smoothly, indicating no latent heat effects. The absence of crystal formation, in addition to the absence of the latent heat effect, indicated that a clathrate did not form.

EXAMPLE 5

1,1,2,2,3,3-Hexafluoropropane (HFC-236ca) and water were mixed in a small vial in a molar ratio of 1:17 and a surfactant (sodium dodecylsulfate) was added at about its critical micelle concentration. The vial was covered and cooled to about 2° C. The mixture was allowed to warm to room temperature during which the temperature of the mixture was taken at one-minute intervals. A plot of temperature versus time revealed that the temperature rose smoothly, indicating no latent heat effects. The absence of crystal formation, in addition to the absence of the latent heat effect, indicated that a clathrate did not form.

Various modifications and changes may be made without departing from the true scope of the invention, which is defined by the following claims.

We claim:

1. A clathrate or clathrate forming mixture comprising water and a hydrofluorocarbon having at least three carbons and a molecular diameter less than about 7 Å selected from the group consisting of $CF_2HCF_2CH_2F$ and $CHF_2CF_2CH_3$.

2. The clathrate forming mixture of claim 1 further comprising at least one additional component selected from the group consisting of surfactant, help gases, hydrochlorofluorocarbons and hydrochlorocarbons.

3. A clathrate forming mixture according to claim 1 wherein said hydrofluorocarbon is $CF_2HCF_2CH_2F$.

4. A clathrate forming mixture according to claim 1 wherein said hydrofluorocarbon is $CHF_2CF_2CH_3$.

5. A clathrate according to claim 1 wherein said hydrofluorocarbon is $CF_2HCF_2CH_2F$.

6. A clathrate according to claim 1 wherein said hydrofluorocarbon is $CHF_2CF_2CH_3$.

7. A clathrate forming mixture according to claim 3 further comprising at least one additional component selected form the group consisting of surfactant, help gases, hydrochlorofluorocarbons and hydrochlorocarbons.

8. A clathrate forming mixture according to claim 4 further comprising at least one additional component selected form the group consisting of surfactant, help gases, hydrochlorofluorocarbons and hydrochlorocarbons.

9. A clathrate according to claim 5 further comprising at least one additional component selected form the group consisting of surfactant, help gases, hydrochlorofluorocarbons and hydrochlorocarbons.

10. A clathrate according to claim 6 further comprising at least one additional component selected form the group consisting of surfactant, help gases, hydrochlorofluorocarbons and hydrochlorocarbons.

* * * * *